United States Patent
Maitre (10) Patent No.: US 12,456,335 B2
(45) Date of Patent: Oct. 28, 2025

(54) VEHICLE WAKE-UP FROM A DIAGNOSTIC CONNECTOR THROUGH ACCESS CONTROL

(71) Applicant: Volvo Truck Corporation, Gothenburg (SE)

(72) Inventor: Julien Maitre, Chuzelles (FR)

(73) Assignee: Volvo Truck Corporation, Gothenburg (SE)

( * ) Notice: Subject to any disclaimer, the term of this patent is extended or adjusted under 35 U.S.C. 154(b) by 154 days.

(21) Appl. No.: 18/244,488

(22) Filed: Sep. 11, 2023

(65) Prior Publication Data
US 2024/0112508 A1 Apr. 4, 2024

(30) Foreign Application Priority Data
Sep. 29, 2022 (EP) .................................... 22198566

(51) Int. Cl.
| | | |
|---|---|---|
| G07C 5/00 | (2006.01) | |
| G06F 21/44 | (2013.01) | |
| G06F 21/81 | (2013.01) | |
| H04L 12/12 | (2006.01) | |
| H04L 41/0659 | (2022.01) | |

(52) U.S. Cl.
CPC ............ G07C 5/008 (2013.01); H04L 12/12 (2013.01); H04L 41/0659 (2013.01); *G07C 2205/02* (2013.01)

(58) Field of Classification Search
CPC ..... G07C 5/008; G07C 2205/02; H04L 12/12; H04L 41/0659; H04L 9/3213; H04L 2209/84; H04L 63/0807; G06F 21/44; G06F 21/81

USPC ......................................................... 701/31.4
See application file for complete search history.

(56) References Cited

U.S. PATENT DOCUMENTS

| | | | |
|---|---|---|---|
| 2009/0248236 A1* | 10/2009 | Schwinke | G07C 5/008 701/31.4 |
| 2014/0300448 A1* | 10/2014 | Ochiai | B60R 25/24 340/5.72 |
| 2017/0200335 A1* | 7/2017 | Da Deppo | G07C 9/00309 |
| 2018/0099643 A1* | 4/2018 | Golsch | G01S 13/765 |

(Continued)

FOREIGN PATENT DOCUMENTS

| | | |
|---|---|---|
| CN | 112578764 A | 11/2021 |
| EP | 3907673 A1 | 11/2021 |

(Continued)

OTHER PUBLICATIONS

Extended European Search Report, European Application No. 22198566. 6, mailed Mar. 2, 2023, 7 pages.

*Primary Examiner* — Tyler D Paige
(74) *Attorney, Agent, or Firm* — Sage Patent Group (57) ABSTRACT

A method comprising:
receiving, by a processor device of an electronic control unit, an indication for a vehicle to transition from an inactive mode to an active mode;
at least partially transitioning at least the ECU of the vehicle to an active mode responsive to receiving the indication;
transitioning the at least the ECU back to the inactive mode in response to at least one of:
determining that an authentication or an authorization was not received during a grace period; and
determining that an authentication or an authorization failed during the grace period.

22 Claims, 11 Drawing Sheets

(56) References Cited

U.S. PATENT DOCUMENTS

| | | | |
|---|---|---|---|
| 2018/0170312 A1* | 6/2018 | Yamamoto | B62H 5/08 |
| 2021/0170903 A1* | 6/2021 | Tsuchiya | B60L 58/16 |
| 2021/0197764 A1* | 7/2021 | Siswick | B60R 25/24 |
| 2023/0186696 A1* | 6/2023 | Santoro | G07C 5/02 |
| | | | 340/995.27 |
| 2024/0112508 A1* | 4/2024 | Maitre | G06F 21/44 |

FOREIGN PATENT DOCUMENTS

| | | | | |
|---|---|---|---|---|
| EP | 4346164 A1 * | 4/2024 | ............ | G06F 21/44 |
| WO | 2021156891 A1 | 8/2021 | | |

* cited by examiner

VEHICLE WAKE-UP FROM A DIAGNOSTIC CONNECTOR THROUGH ACCESS CONTROL

CROSS REFERENCE TO RELATED APPLICATIONS

This application claims priority to European Patent Application No. 22198566.6 filed 29 Sep. 2022, the disclosure and content of which is incorporated by reference herein in its entirety.

TECHNICAL FIELD

The disclosure relates generally to vehicle diagnostics. In particular aspects, the disclosure relates to waking up a vehicle from a diagnostic connector through access control. The disclosure can be applied in heavy-duty vehicles, such as trucks, buses, and construction equipment. Although the disclosure may be described with respect to a particular vehicle, the disclosure is not restricted to any particular vehicle.

BACKGROUND

To run vehicle diagnostic activities, the electronic control unit (ECU) of a vehicle needs to be powered up. Traditionally, the workshop technician goes into the vehicle cab and turns the key to the ignition position or pushes the corresponding Start button, and then leaves the key in the vehicle cab. This can lead to keys being lost.

Recently with the introduction of Ethernet on the diagnostic connector, the corresponding ISO/SAE standard has defined a dedicated pin (i.e., an Ethernet activation line) to wake-up the Ethernet diagnostic link on the vehicle side. This Ethernet activation line is generally implemented to wake up the Ethernet diagnostic link when the vehicle is already powered up.

However, a vehicle manufacturer may decide to enable the dedicated pin to partially wake up or completely wake up the vehicle via the dedicated pin. There is a risk of battery draining and deep discharge of the battery. For example, a driver or technician may have purchased an OBD (on-board diagnostic) dongle that always sets the Ethernet activation line to partially wake up or completely wake up the vehicle. This will also drain the battery if the Ethernet activation line wakes up the vehicle without further control.

SUMMARY

According to an aspect of the disclosure, the vehicle may be powered up using a dedicated pin on the diagnostic connector where the vehicle is kept awake (i.e., an active mode) on a successful authentication and authorization and set to standby or sleep mode (i.e., an inactive mode) on a failed authentication or authorization. This aspect of the disclosure may seek to reduce battery drain of the battery when the diagnostic connector is used to wake the vehicle up. A technical benefit may include increasing the life of the battery of a vehicle, thereby reducing battery issues or defects.

According to a first aspect of the disclosure, a method includes receiving, by a processor device of an electronic control unit, ECU, an indication for a vehicle to transition from an inactive mode to an active mode. The method includes at least partially transitioning at least the ECU of the vehicle to an active mode responsive to receiving the indication. The method includes transitioning the at least the ECU back to the inactive mode in response to at least one of: determining that an authentication or an authorization was not received during a grace period; and determining that an authentication or an authorization failed during the grace period. The first aspect of the disclosure may seek reduce battery drain of the battery when the diagnostic connector is used to wake the vehicle up. A technical benefit may include only allowing authorized and authenticated tools/users to activate the vehicle via the indication.

In some examples, the method includes setting the grace period. A technical benefit may include restricting the time period in which an authentication and authorization is received, thereby potentially increasing battery life of the vehicle.

In some examples, the method includes setting a grace period time after receiving the indication and ending the grace period when the grace period time expires. A technical benefit may include restricting the time period in which an authentication and authorization is received, thereby potentially increasing battery life of the vehicle.

In some examples, the inactive mode is at least one of a standby mode and a sleep mode and the active mode is an awake mode.

In some examples, receiving the indication includes receiving the indication on a diagnostic Ethernet activation line on a diagnostic connector of the vehicle. A technical benefit may include eliminating the need for a vehicle key to diagnose the vehicle, which may result in fewer misplaced or lost keys.

In some examples, receiving the indication comprises receiving the indication wirelessly. A technical benefit may include eliminating the need for a vehicle key to diagnose the vehicle, which may result in fewer misplaced or lost keys.

In some examples, the method includes transitioning the at least one ECU to an active mode when the tool has successfully authenticated and authorized. A technical benefit may include restricting use of the diagnostic Ethernet activation line to authenticated and authorized tools, thereby prohibiting the use of diagnostic Ethernet activation line by unauthorized or unauthenticated tools.

In some examples, the method includes transitioning the at least one ECU to an active mode when a user of the tool has successfully authenticated and authorized. A technical benefit may include restricting use of the diagnostic Ethernet activation line to authenticated and authorized users, thereby prohibiting the use of diagnostic Ethernet activation line by unauthorized or unauthenticated users.

In some examples, determining that the authorization has failed includes determining if the tool or the user is authorized to transition the at least one ECU from the inactive mode to the active mode and transitioning the at least one ECU to the inactive mode when the tool or the user is not authorized to transition the at least one ECU from the inactive mode to the active mode. A technical benefit may include restricting use of the diagnostic Ethernet activation line to authorized tools and users, thereby prohibiting the use of diagnostic Ethernet activation line by unauthorized or unauthenticated tools and users.

In some examples, the method includes transmitting a token from the tool when the tool or the user has been authenticated and authorized, the token granted for a specified time period. The method further includes transitioning the at least one ECU to the inactive mode responsive to at least one of: determining that the token is outdated and determining that a reauthentication or a reauthorization has failed. A technical benefit may include restricting use of the diagnostic Ethernet activation line to authorized tools and users, thereby prohibiting the use of diagnostic Ethernet activation line by unauthorized or unauthenticated tools and users.

In some examples, the method includes periodically determining if an Ethernet link is not working and transitioning the at least one ECU to the inactive mode responsive to determining that the Ethernet link is not working. A technical benefit may include possibly saving battery life when the Ethernet link is not working by transitioning to the inactive mode, which results in less battery draw, The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical effects and corresponding advantages.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
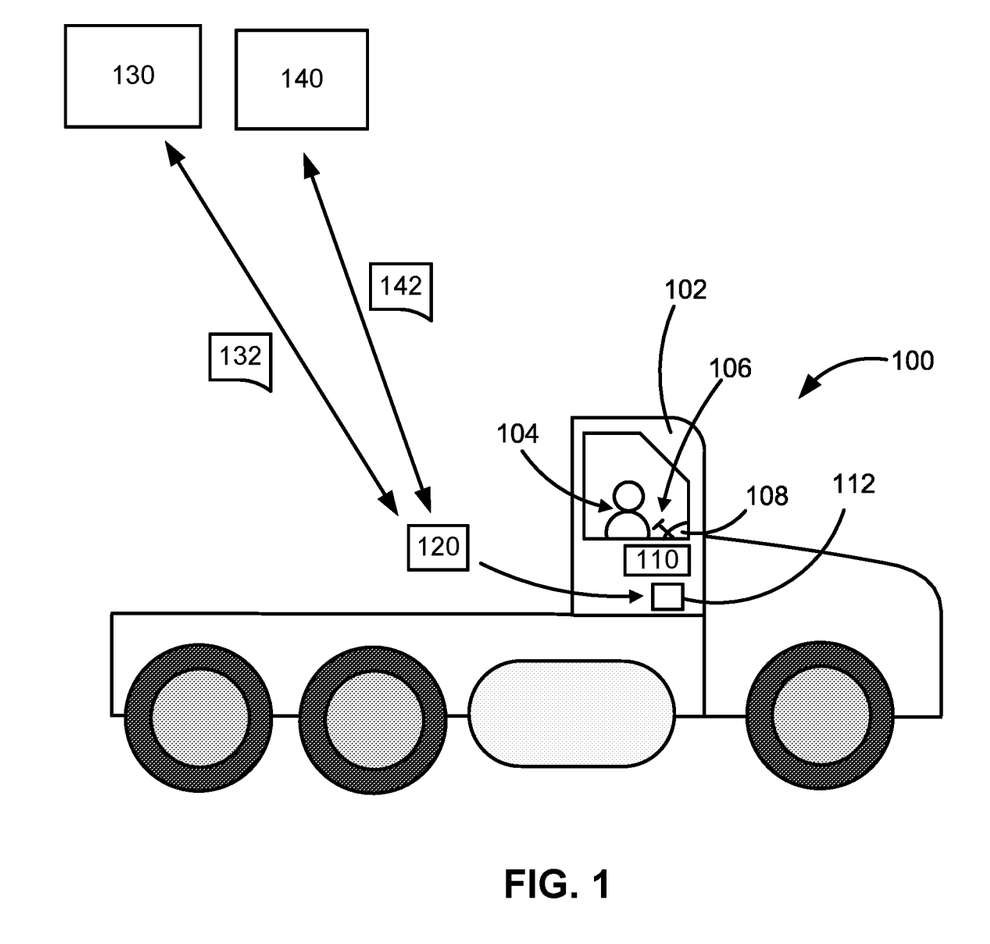
FIG. 1 is an illustration of a truck wherein the aspects of the disclosure may be implemented.

FIG. 1 is an exemplary vehicle in which the various aspects of the disclosure may be used according to one example. FIG. 1 illustrates a truck 100 having a cab 102 used by a vehicle user 104. A vehicle electronic control unit (ECU) 110 controls the vehicle 100 responsive to commands by the vehicle user 104 via steering wheel 106 and dashboard 108 and during maintenance, by commands sent through the on-board diagnostic connector 112. For example, when diagnostics are done during maintenance, a vehicle communication interface (VCI) 120 is connected to the on-board diagnostic connector 112. The VCI 120 may need to be authenticated and authorized before being allowed to provide commands to various parts (e.g., modules) of the vehicle ECU 110. FIG. 1 illustrates an authentication server 130 and an authorization server 140 that communicates with the VCI 120 to provide the authentication 132 and authorization 142, respectively. While shown separately, the authentication server 130 and authorization server 140 may be part of a same network node, be part of vehicle ECU 110, be part of a same network server node being in a client server relationship with client components located as part of vehicle ECU 110.

Figure 2:
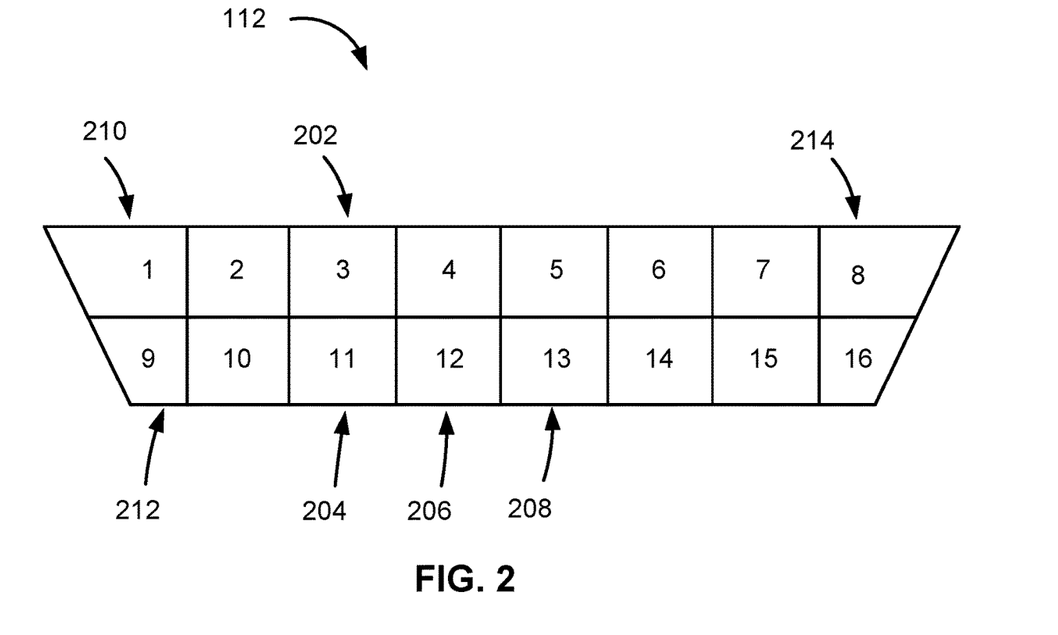
FIG. 2 is an illustration of the pin-out of an on-board (OBD) diagnostic connector according to aspects of the disclosure.
Figure 3:
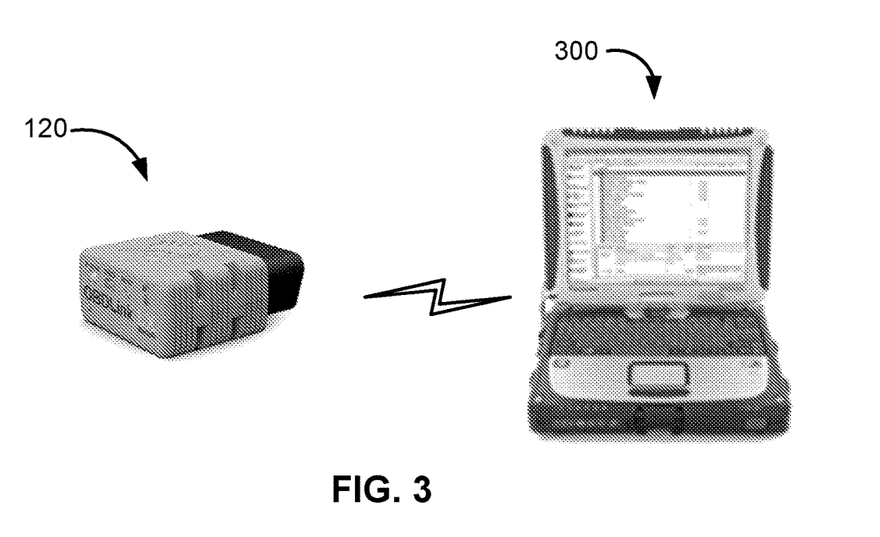
FIG. 3 is an illustration of a vehicle communication interface (VCI) and a diagnostic tool according to aspects of the disclosure.

FIG. 2 illustrates an exemplary on-board (OBD) diagnostic connector 112 that technicians and other personnel can use to diagnose the vehicle. A diagnostic interface (e.g., a Vehicle Communication Interface (VCI)) may need to be physically connected to the OBD diagnostic connector 112 for the technicians and other users to diagnose the vehicle 100. FIG. 3 illustrates an example of a VCI 120, which is an OBD dongle that is connected to the OBD diagnostic connector 112. The OBD dongle allows a tool 300 to wirelessly communicate (e.g., via Bluetooth) with the OBD dongle to wake-up at least the ECU 110 of the vehicle for performing diagnostics of the vehicle 100. Other VCIs can be connected to the tool 300 via a wired connection.

The OBD connector 112 is a sixteen pin connector. Returning to FIG. 2, pins 202 and 204 are for Ethernet Receive (RX) connections where pin 202 is Ethernet Rx(+) and pin 204 is Ethernet RX(−). Pins 206 and 208 are for Ethernet Transmit (Tx) where pin 206 is Ethernet Tx(+) and pin 208 is Ethernet Tx(−). Pins 210 and 212 are for vehicle manufacturer-specific usage (e.g., CAN_H line and CAN_L line respectively). Pin 214 is an Ethernet identification of pin assignment and is used as an Ethernet activation line. When the vehicle 100 via ECU 110 detects an "unset" to "set" transition on the Ethernet activation line, the vehicle partially or fully wakes up.

On some vehicles using Ethernet on the diagnostic connector 112, it is possible to use the Ethernet activation line 210 as a trigger to wake-up components on the vehicle such as an electronic control unit (ECU) 110 of the vehicle 100. Currently, there is no control of authentication. Any OBD dongle can create issues.

Figure 4:
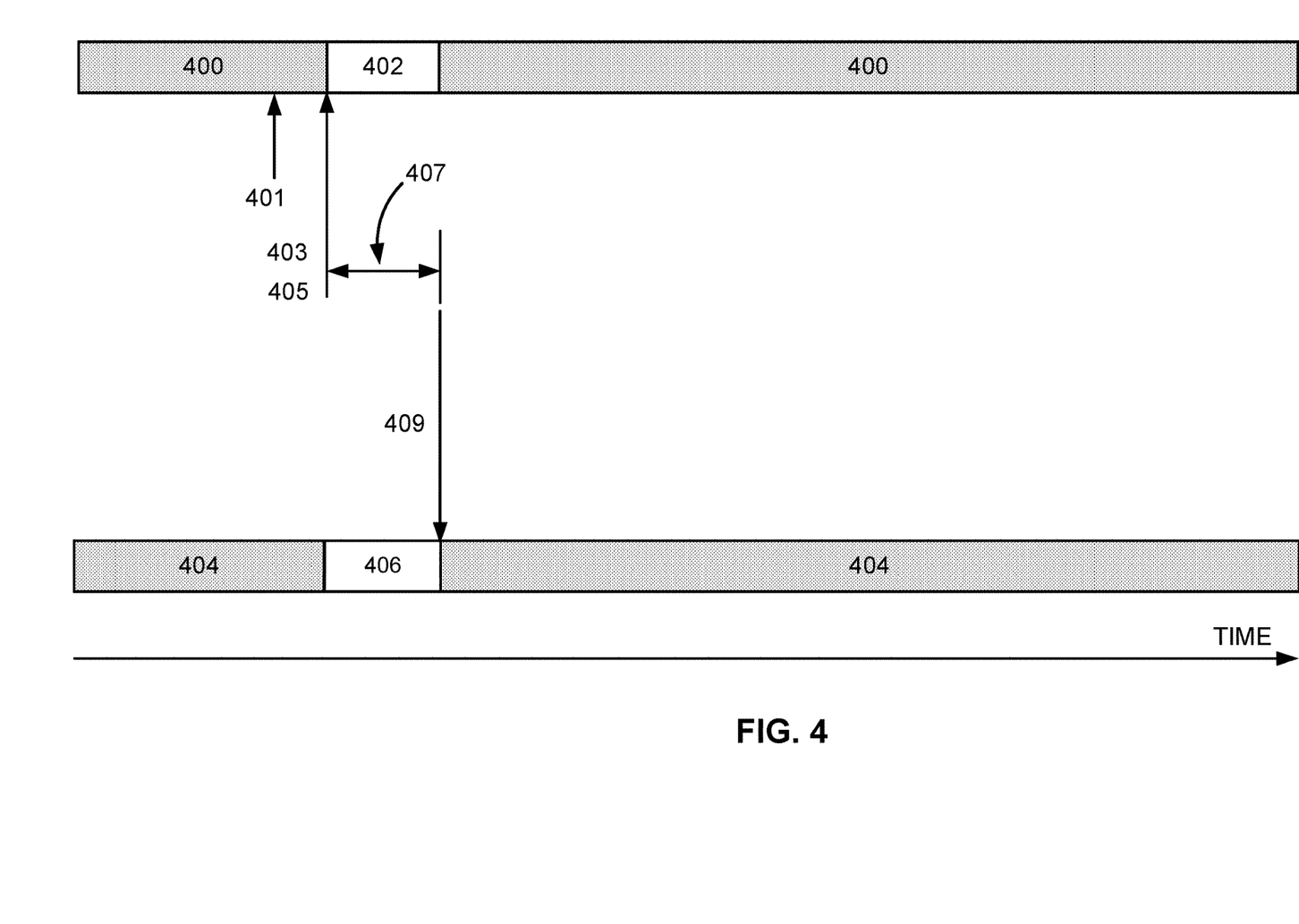
FIG. 4 is an illustration of a diagnostic tool not being authenticated and/or authorized during a grace period according to aspects of the disclosure.

Various aspects require the diagnostic tool 300 and/or the diagnostic tool user to be authenticated and authorized to keep the vehicle 100 awake. FIG. 4 illustrates an aspect of requiring authentication and authorization. In FIG. 4, the shaded section 400 indicates the Ethernet activation line is in an inactive mode or not connected. The unshaded section 402 indicates the Ethernet activation line is in an active mode. The shaded section 404 indicates the vehicle is in an inactive mode. The unshaded section 406 indicates the vehicle 100 is partially awake (i.e., at least the ECU 110 of the vehicle 100 is in an active mode) or the vehicle 100 is in an active mode.

During operation, at time 401, a diagnostic tool 300 (e.g., OBD dongle 120) is connected to the vehicle. At time 403, the diagnostic tool sets the Ethernet activation line to be in a set state. At time 405, the vehicle ECU detects an "unset" to "set" transition. The vehicle (e.g., the ECU 110) starts a grace period timer at time 405 for a grace period 407.

If no authentication 132 and authorization 142 is received before the end of the grace period (at time 409), the vehicle 100 (e.g., at least the ECU 110) transitions to the inactive mode (i.e., standby mode or sleep mode) at time 409. The authentication and/or the authorization may be at the tool level or at the user level or a combination of the tool level and the user level. For example, authentication can be at the tool level and authorization at the user level. The authentication can be part of the vehicle 100 or be remote (e.g., in a back office of a vehicle manufacturer or fleet office).

Figure 5:
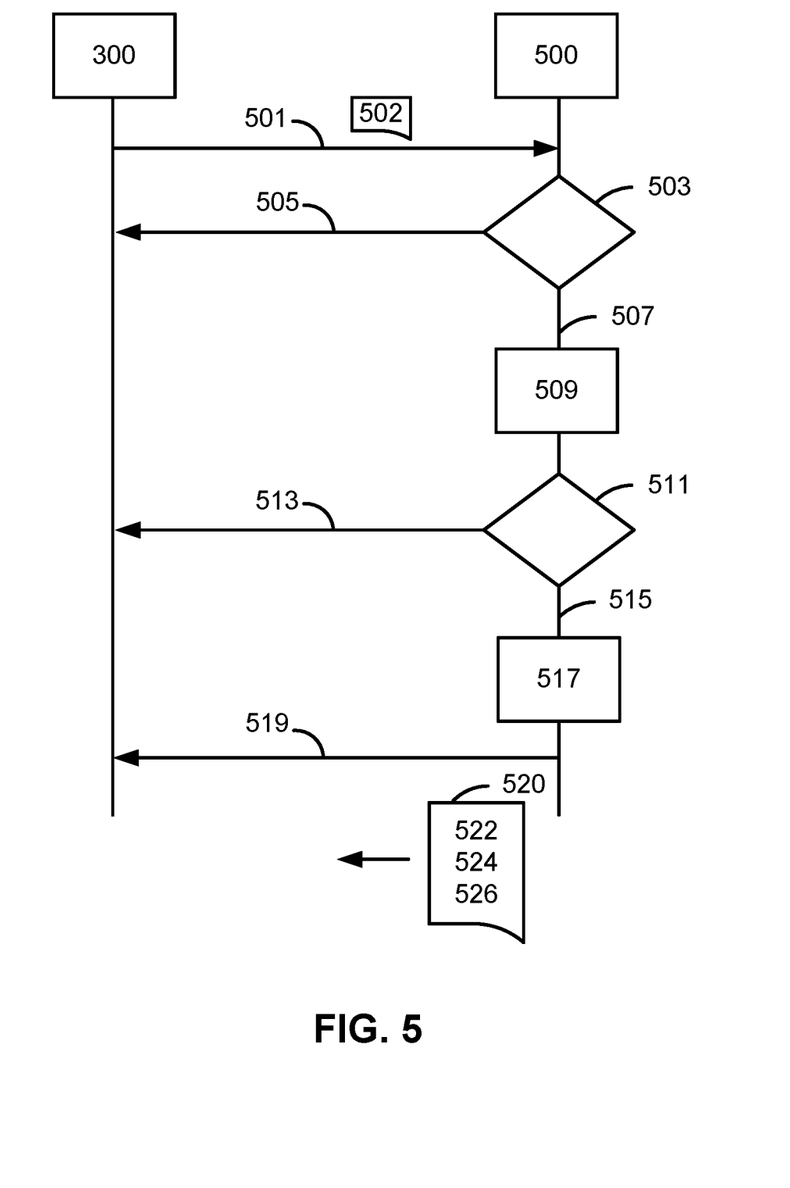
FIG. 5 is a signaling diagram illustrating an example of authentication and authorization according to one example.

FIG. 5 illustrates an example of authentication 132 and authorization 142. The server 500 may be part of the vehicle 100 or separate from the vehicle 100 or be distributed between the vehicle 100 and a server (which can be a distributed server) in the cloud such as, for example, in a back office of the vehicle manufacturer or fleet office. In operation 501, the diagnostic tool sends an authentication request to the server 500. The authentication request in one example includes a username and password. In operation 503, the server determines whether or not the diagnostic tool 300 and/or user has successfully authenticated. In operation 505, if the diagnostic tool 300 or the user has failed authentication, then the server 500 transmits an authentication failure indication to the diagnostic tool 300 in operation 505. The ECU does not move to the active mode (e.g., is ready to receive diagnostic commands) until an authentication and an authorization are successful.

If the diagnostic tool 300 and the user has successfully authenticated, the operation proceeds along path 507. In operation 509, the server 500 determines the diagnostic tool 300 authorizations and user authorizations including whether the diagnostic tool 300 or user is authorized to use the Ethernet activation line 214 to transition the vehicle (e.g., at least the ECU 110) from the inactive mode to the inactive mode.

In operation 511, the server 500 determines if the diagnostic tool 300 and/or the user is authorized to use the Ethernet activation line 214 to transition the vehicle (e.g., at least the ECU) from the inactive mode to the inactive mode. For example, the diagnostic tool/user can be fully authenticated, has some authorization to perform diagnostics when the vehicle is already powered-up but is not authorized to perform a vehicle wake-up using the diagnostic Ethernet activation line. If the diagnostic tool 300 or the user is not authorized to use the Ethernet activation line 214, then the authorization has failed and the server transmits a failed authorization indication to the tool 300 in operation 513.

If the diagnostic tool 300 and the user is authorized to use the Ethernet activation line, operation procedures along path 515. In operation 517, the server 500 generates a token with diagnostic tool authorization and user authorization and a token time period in which the token is authorized (illustrated in FIG. 9 hereinbelow). For example, the diagnostic tool 300 may be limited to running a specified set of diagnostics while the user may have a larger set of diagnostic operations including operations that the diagnostic tool 300 is not able to perform while other tools are able to perform these operations. In one example, the token may specify the diagnostic tool authorization, the user authorization, and the token time period. In another example, the token may specify the authorization having the lowest level of authorization and the token time period. For example, if the user is authorized to perform diagnostic operations including operations that the diagnostic tool 300 is not able to perform, then only the diagnostic tool authorization and token time period is provided with the token. In operation 519, the token is transmitted to the diagnostic tool 300 and then on to the vehicle 100.

Figure 6:
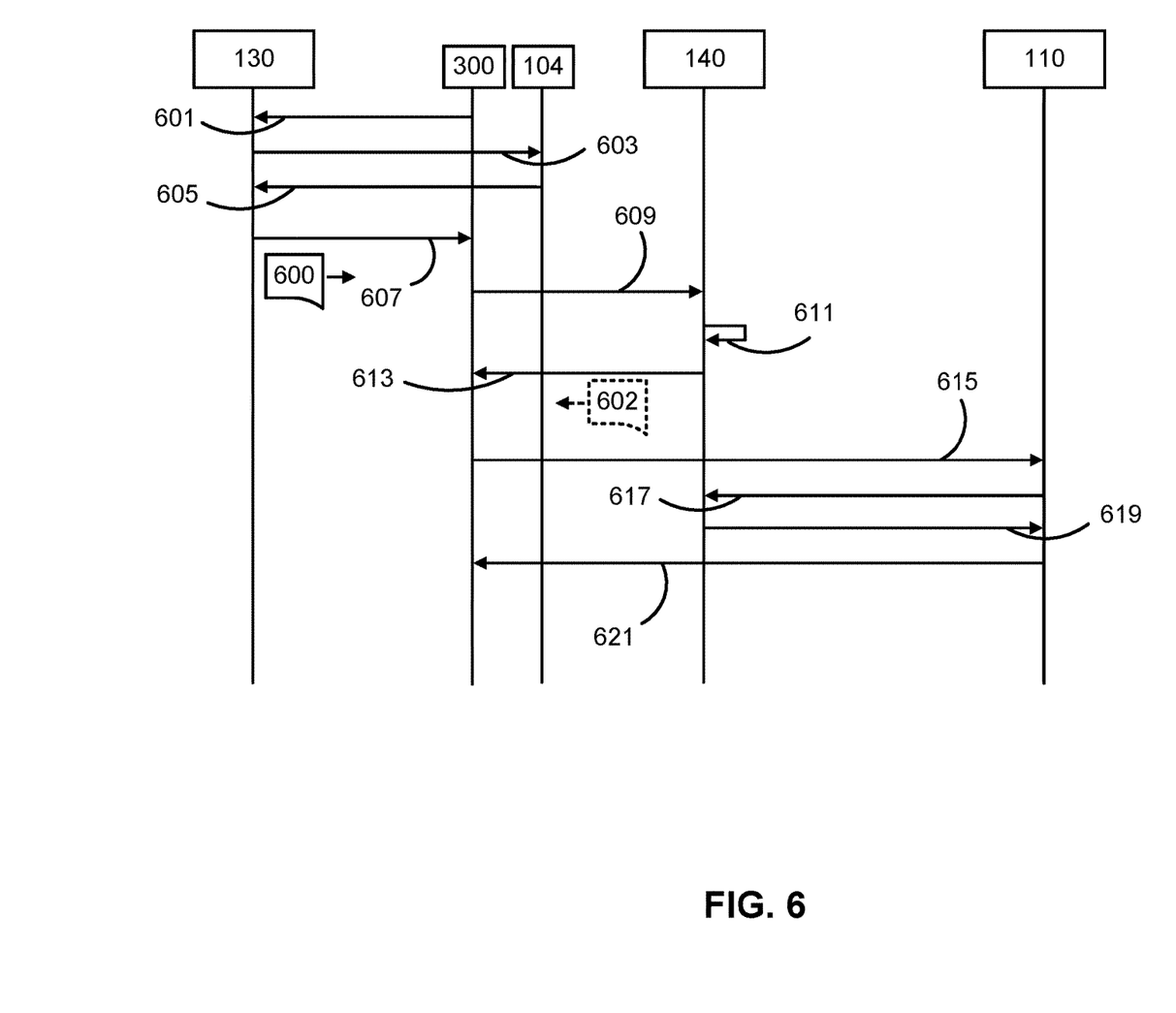
FIG. 6 is a signaling diagram illustrating an example of authentication and authorization according to another example.

FIG. 6 illustrates a signaling diagram of an aspect of authorization and authentication according to one aspect. FIG. 6 illustrates an authentication server 130, a tool 300, a user 104, an authorization server 140, and vehicle ECU 110. While the authentication server and authorization server 140 are illustrated as separate entities, they may be combined into a single server, integrates or partially integrated with the ECU 100, etc. In operation 601, the tool 300 transmits a request for authentication to the authentication server 130. The authentication server 130 transmits a request for credentials (e.g., username and password) to the user 104 in operation 603. The user 104 responds with the credentials in operation 605.

If the credentials are valid, the authentication server 130 responds with a JWT (JSON (Java script object notation) Web Token) to the tool 300 in operation 607. The tool 300 receives the JWT and submits a request for an access token to authorization server 140 via the VCI 120 in operation 609 where the request includes the JWT.

In operation 611, the authorization server 140 validates the JWT using known validation techniques. Typically, a JWT is validated by parsing (e.g., decoding) a current hash value and the original hash value and comparing the hash values to verify the token signature is valid. If the validation is successful, the authorization server 140 transmits a response with an access token in operation 613 to the tool 300. If not successful, the authorization server 140 transmits a failure indication to the tool 300.

The tool 300 transmits a request for a ECU resource (i.e., a diagnostic command or request) via the VIC 120 to the ECU 110 in operation 615 with the access token included. The ECU 110 receives the request and in operation 617, transmits a request to the authorization server 140 to request access token validation and information regarding the level of authorization (e.g., what operations are allowed or disallowed for the tool 300 and/or the user 104) of the tool 300 and/or user 104. If the access token is valid, the authorization server 140 transmits a response with the information in operation 619 to the ECU 110.

In operation 621, the ECU 110 transmits a response to the request for the ECU resource. For example, if the request is to run a diagnostic command in which the tool 300 and user 104 are authorized to run, the response includes the results of running the diagnostic command.

Figure 7:
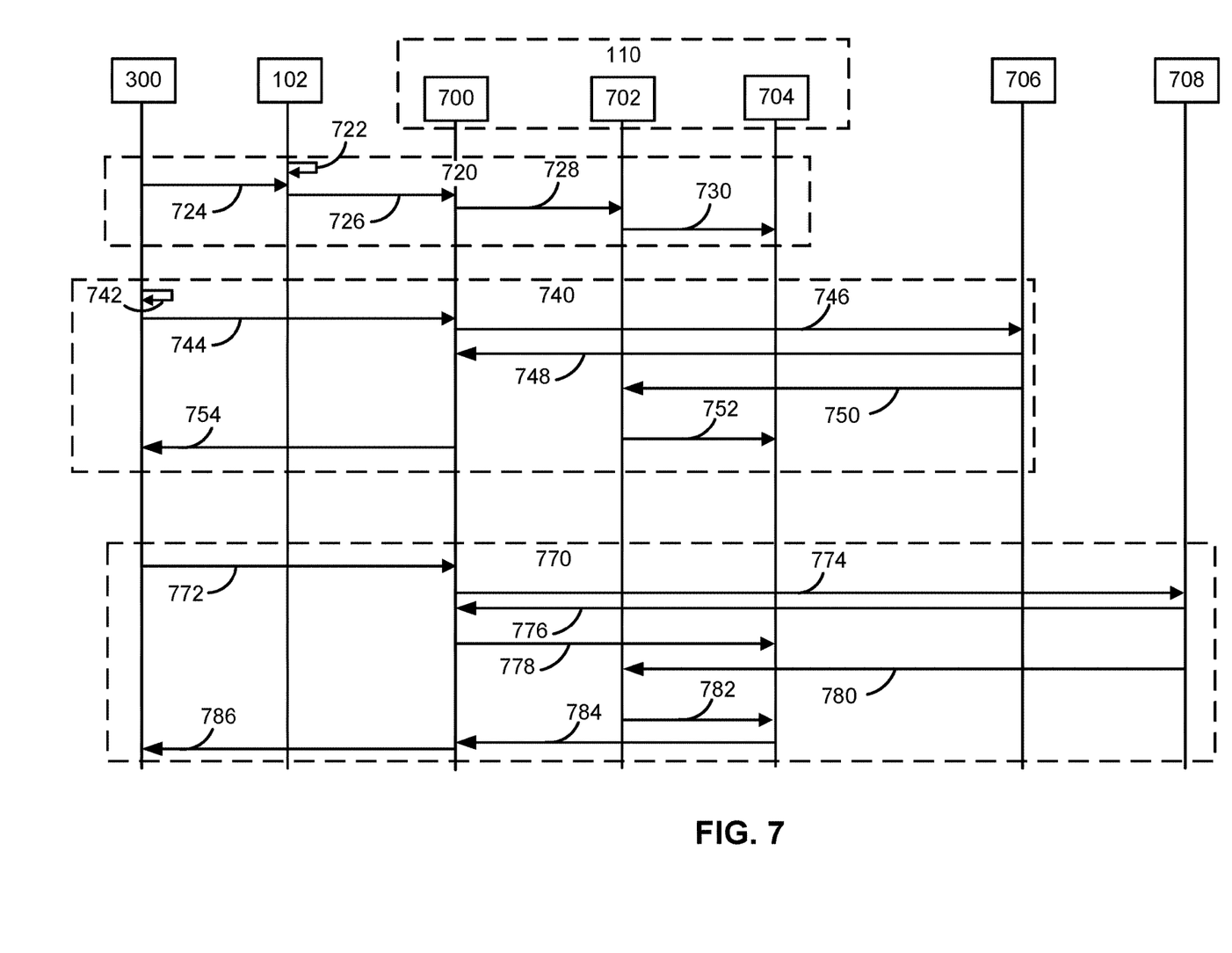
FIG. 7 is a signaling diagram illustrating an example of authentication and authorization according to a further example.

FIG. 7 illustrates a signaling diagram when there is a separate authentication server and authorization server according to another aspect. In. FIG. 7, various communications start at the diagnostic tool 300, the VCI 102, various ECU modules (ECU linked OBD module 700, ECU controlling vehicle sleep operational module 702, and ECU others 704 of the ECU 110), an authentication server 707 and a separate authorization server 708 for purposes of description. The authentication server 706 and the authorization server 708 may be integrated, be part of the vehicle ECU 110, etc.

The initial wake-up block 720 starts at operation 722 where the VCI 102 and diagnostic tool 300 are connected. The diagnostic tool 300 transmits a request vehicle wake-up at operation 724. The VCI 102 in turn transmits the "unset" to "set" transition on the Ethernet activation line 214 to ECU linked OBD module 700. The ECU linked OBD module 700 transmits a wake-up ECU needed for the authentication/ authorization to the ECU controlling vehicle sleep operational module 702, which in turn transmits the wake-up ECU needed for the authentication/authorization to the ECU others 704.

The authentication block 740 of FIG. 7 starts with the diagnostic tool 300 performing a user login or a tool login at operation 742. This operation can be performed earlier than the request vehicle wake-up in block 720. In operation 744, the diagnostic tool 300 transmits an authentication request to the ECU linked OBD module 700 via VCI 102, which in turn transmits the authentication request to the authentication server 706 in operation 746. Upon a successful authentication, the authentication server 706 transmits an authentication response in operation 748. In operation 750, the authentication server 706 transmits an indication of a successful authentication to the ECU controlling vehicle sleep operational module 702, which in turn transmits a keep operational indication to the ECU others 704 in operation 752. In operation 754, the ECU linked OBD module 700 transmits an authentication response to the diagnostic tool 300.

While not shown, the diagnostic tool 300 has previously acquired an access token via the authorization server 708

The authorization block 770 of FIG. 7 starts with the diagnostic tool 300 transmitting a diagnostic API request in operation 772 that includes the access token to the ECU linked OBD module 700, which in turn transmits a token check request to the authorization server 708 in operation 774. Upon a successful authorization check, the authorization server 708 transmits an authorization response (with an access token) in operation 776 that indicates the diagnostic tool 300 and/or the user is authorized to run the diagnostic API request. In operation 778, the ECU linked OBD module 700 transmits a diagnostic request based on the diagnostic API request to the ECU others 704. In operation 780, the authorization server 708 transmits a successful authorization to the ECU controlling vehicle sleep operational module 702, which in turn transmits a keep operational indication to the ECU others 704 in operation 782. In operation 784, the ECU others 704 transmits a diagnostic response to the ECU linked OBD module 700, which in turn transmits a diagnostic API response to the diagnostic tool 300 in operation 786.

Figure 8:
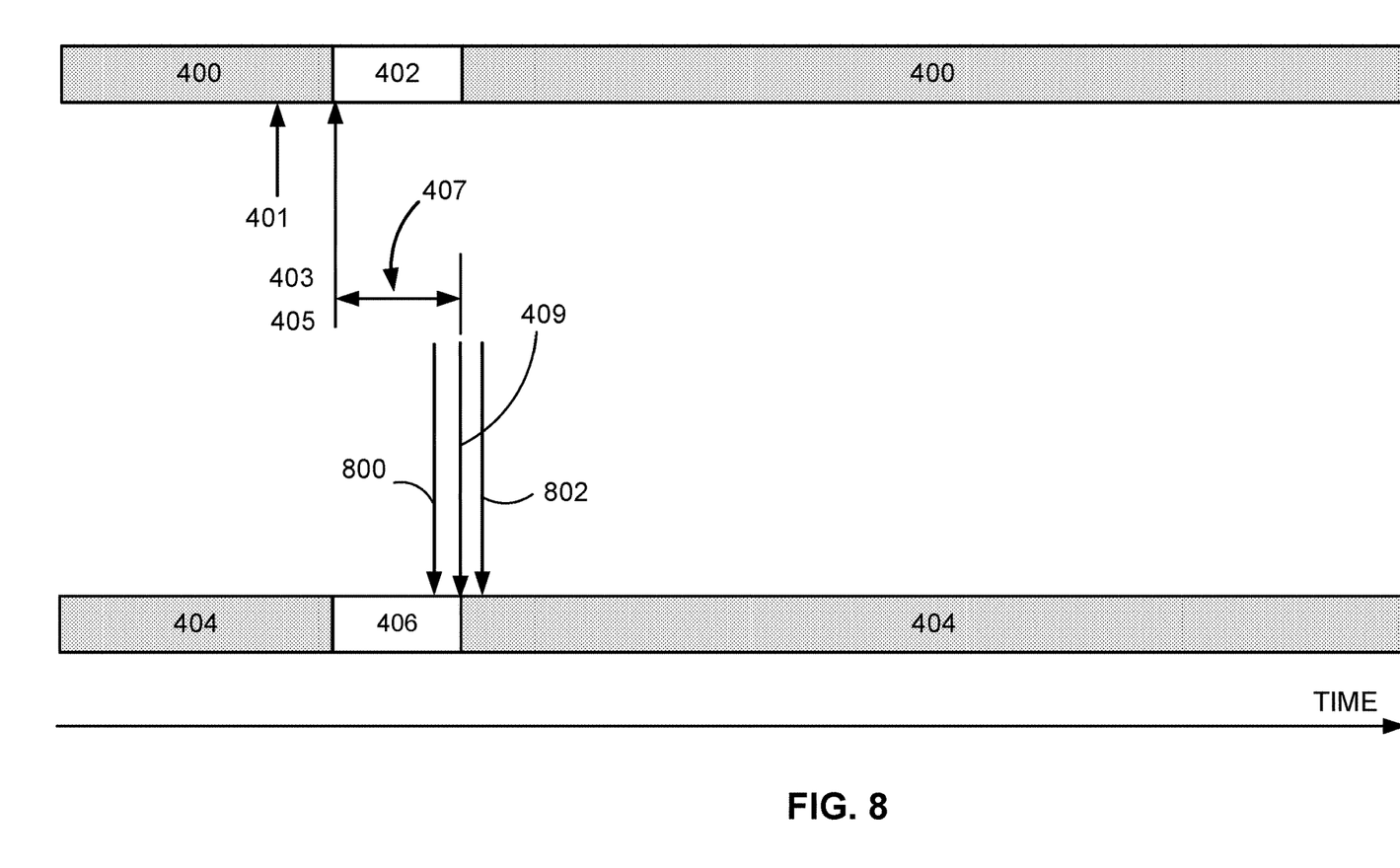
FIG. 8 is an illustration of a diagnostic tool being authenticated but not authorized or being authorized but not authenticated during a grace period according to aspects of the disclosure.

The diagnostic tool 300 and/or the user must be authenticated and authorized during the grace period in some aspects. If just an authentication or an authorization is received during the grace period 407, the vehicle 100 transitions to the inactive mode 404. This is illustrated in FIG. 8 where an authorization or an authentication at time 800 is received during the grace period 407 but an authorization 142 or an authentication 132 (represented by 802) is received after the grace period 407 has expired. Since only one of the authorization 142 or authentication 132 was received during the grace period 407, the vehicle (e.g., at least the ECU 110) transitions to the inactive mode when the grace period expires at time 409.

In other aspects where the vehicle does not authorize the diagnostic tool 300 and/or user, once the diagnostic tool 300 and/or user is authenticated, the ECU 110 will transition to inactive mode.

Figure 9:
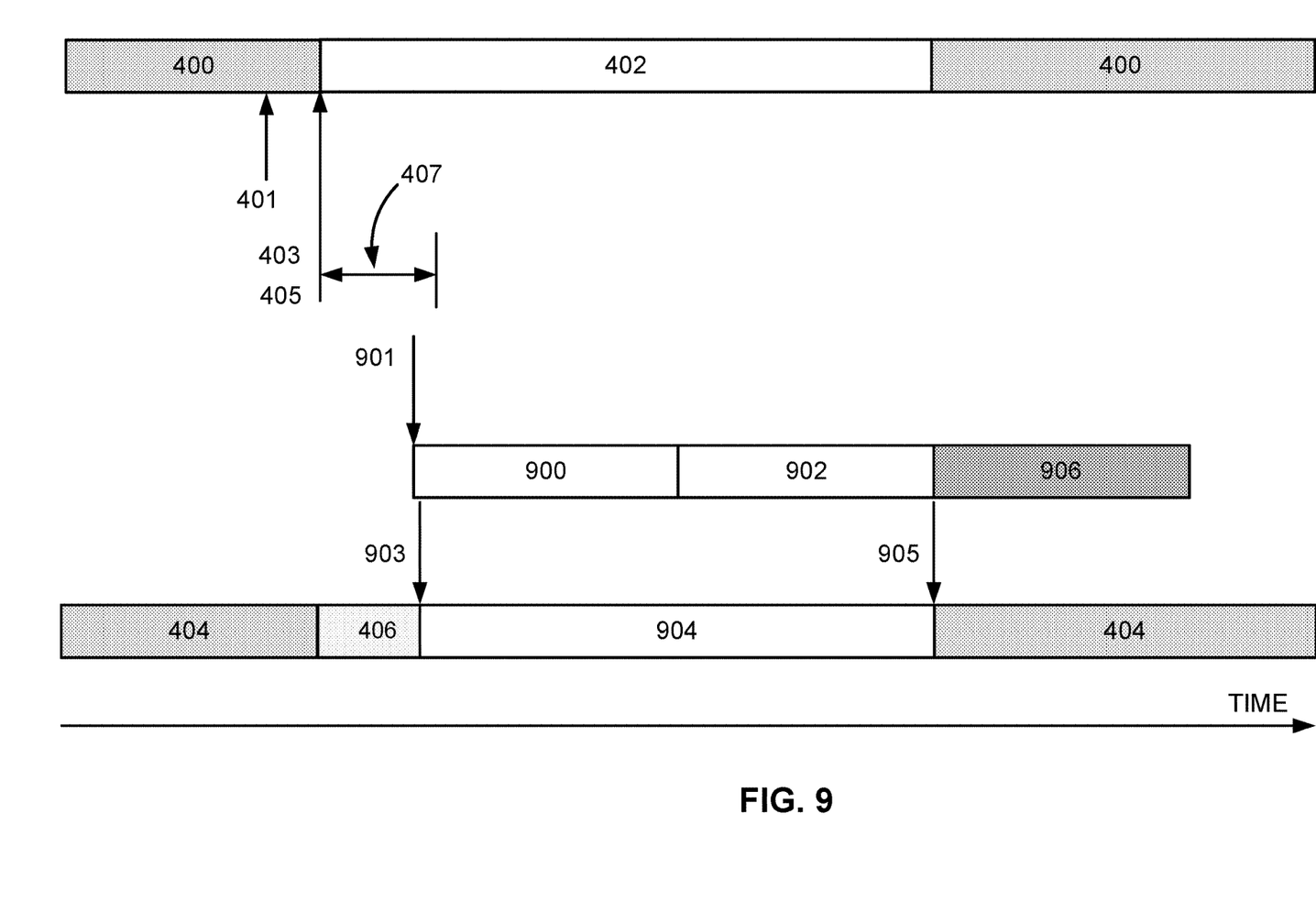
FIG. 9 is an illustration of a diagnostic tool being authentication and authorized within a grace period according to aspects of the disclosure.

FIG. 9 illustrates a successful authentication 132 and authorization 142. In FIG. 9, the unshaded time periods 900 and 902 indicate token time periods. The unshaded section 904 indicates the vehicle (e.g., at least the ECU 110) is in an active mode. The shaded section 906 indicates the token is outdated or the authentication/authorization to renew the token has failed. During operation, at time 901, the diagnostic tool 300 and/or user have been authenticated and authorized and has received the token corresponding to the authorization as described above. At time 903, the vehicle is awake and the ECU 110 is ready for diagnostics as indicated by the unshaded time period 904. The token remains valid for the token time period and needs to be renewed before the token time period expires to keep the vehicle in the active mode. The unshaded time period 902 indicates a valid renewed token/authorization. At time 905, the token was either not renewed or the authentication and authorization to obtain the token failed. At time 805, since the token was either not renewed or the authentication and authorization to obtain the token failed, the vehicle 100, including the ECU 110, is transitioned to the inactive mode.

Figure 10:
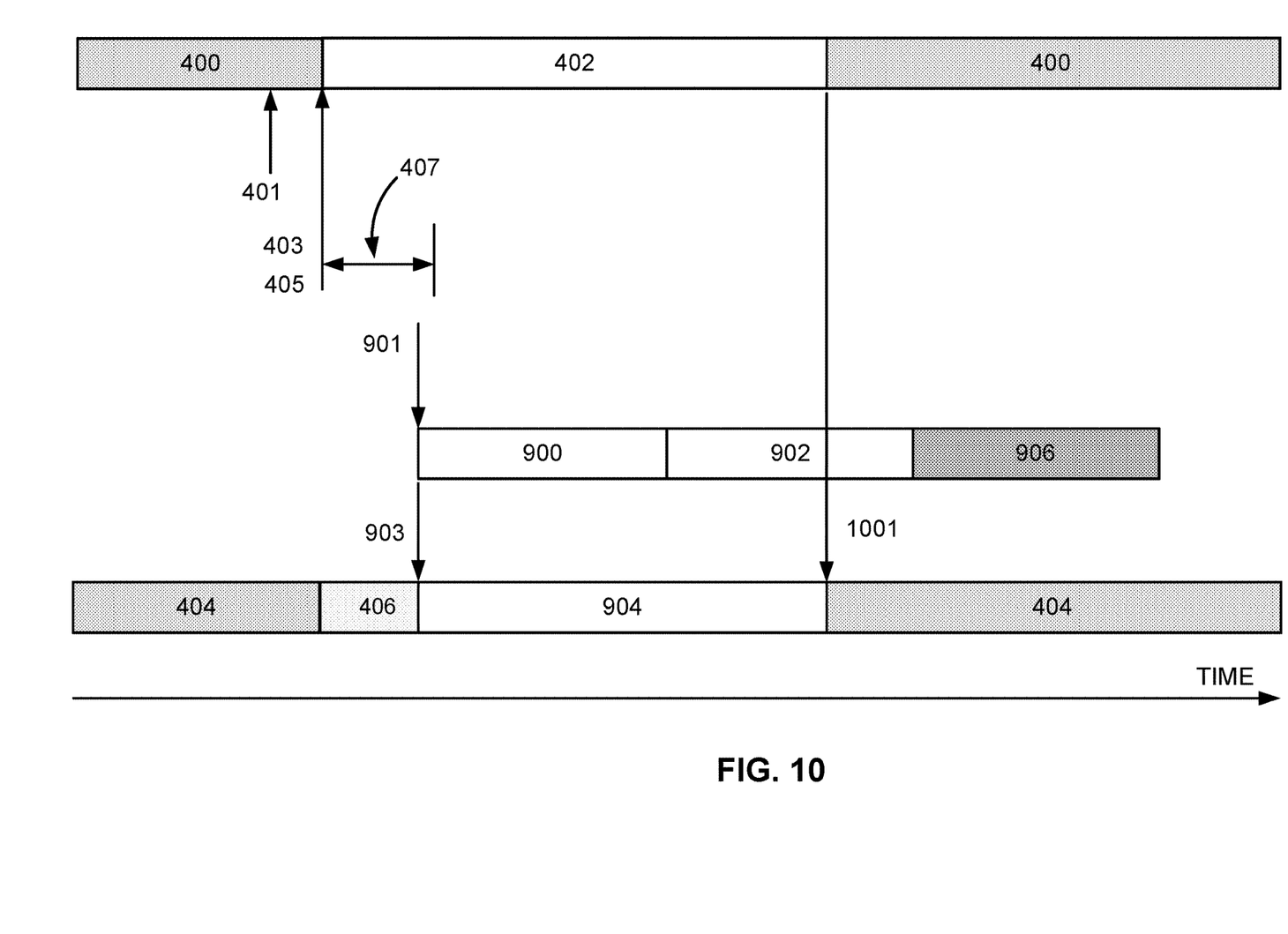
FIG. 10 is an illustration of an Ethernet link failing and the vehicle transitioning to an inactive mode according to aspects of the disclosure.

FIG. 10 illustrates an aspect where the Ethernet activation line is "unset." This could be due to an Ethernet link failure, the VCI 102 unexpectedly getting unplugged from the OBD diagnostic connector 112, and the like. When the Ethernet activation line transitions to the "unset" mode, the vehicle including the ECU 110 transitions to the inactive mode. This is illustrated in FIG. 10 where the Ethernet activation line transitions to the "unset" mode (i.e., inactive mode) at time 1001. The vehicle 100 including the ECU 110 transitions to the inactive mode at time 1001 in response to the Ethernet activation line transition to the "unset" mode. Note that the Ethernet activation line transitions to the "unset" mode even during a valid token time period 902 is ongoing.

FIGS. 11-19 illustrate operations performed from the perspective of the ECU 110.

Figure 11:
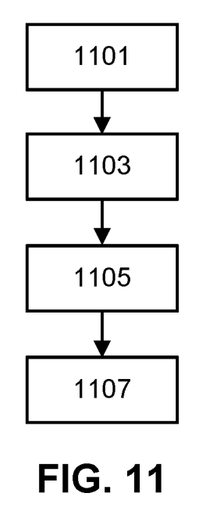
FIGS. 11-19 are flowcharts of operations of an ECU according to aspects of the disclosure.

Turning to FIG. 11, in block 1101 the ECU 110 receives, by a processor device of the electronic control unit (110), an indication for a vehicle to transition from an inactive mode to an active mode. The inactive mode can be a standby mode or a sleep mode. The active mode is a mode where the ECU is awake.

In block 1103, the ECU 110 at least partially transitions at least the ECU of the vehicle to an active mode responsive to receiving the indication. The ECU 110 transitions the ECU back to the inactive mode in response to at least one of: determining in block 1105 that an authentication or an authorization was not received during a grace period; and determining in block 1107 that an authentication or an authorization failed during the grace period.

Figure 12:
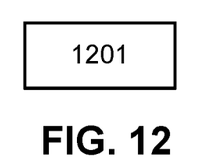
Figure 13:
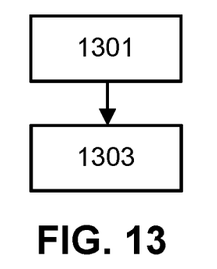

Turning to FIG. 12, in block 1201, the ECU 110 sets the grace period. FIG. 13 illustrates one example of setting the grace period. Turning to FIG. 13, in block 1301, the ECU 110 starts a grace period timer after receiving the indication based on the grace period. In block 1303, the ECU 110 ends the grace period when the grace period timer expires.

Figure 14:
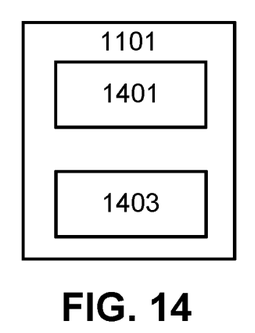

FIG. 14 illustrates examples of receiving the indication. Turning to FIG. 14, in block 1401, the ECU 110 receives the indication by receiving the indication on a diagnostic Ethernet activation line on a diagnostic connector of the vehicle. In another example, in block 1403, the ECU 110 receives the indication wirelessly.

The ECU 110 transitions to the active mode when the diagnostic tool 103 and/or the user successfully authenticates and successfully authorizes. This is illustrated in FIGS. 15 and 16.

Figure 15:
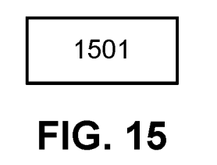
Figure 16:
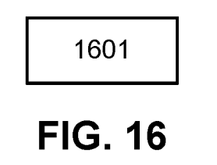

Turning to FIG. 15, in block 1501, the ECU 110 transitions the at least the ECU (110) to an active mode when the diagnostic tool has successfully authenticated and authorized. Turning to FIG. 16, in block 1601, the ECU 110 transitions the at least the ECU (110) to an active mode when the user has successfully authenticated and authorized.

Figure 17:
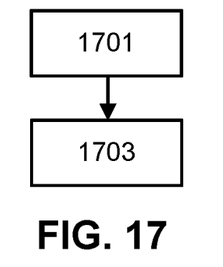

FIG. 17 illustrates one aspect of determining that the authorization has failed. Turing to FIG. 17, in block 1701, the ECU 110 determines if the diagnostic tool (300) or the user is authorized to transition the at least the ECU 110 from the inactive mode to the active mode. In block 1703, the ECU 110 transitions) the at least the ECU 110 to the inactive mode when the diagnostic tool 300 or the user is not authorized to transition the at least the ECU 110 from the inactive mode to the active mode.

Figure 18:
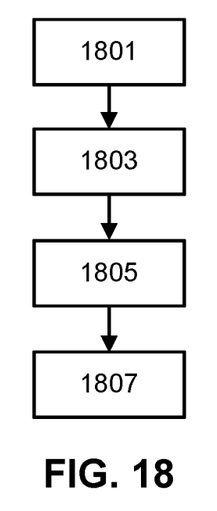

FIG. 18 illustrates an aspect of using a token to keep at least the ECU 110 in the active mode. Turning to FIG. 18, the ECU 110 in block 1801 receives a token from the diagnostic tool 300 when the diagnostic tool 300 or the user has been authenticated and authorized, the token granted for a specified token time period. In block 1803, the ECU 110, responsive to the token being renewed during the specified token time period, keeps the at least the ECU in the active mode. The ECU 110 transitions at least the ECU 110 to the inactive mode responsive to at least one of: determining in block 1805 that the token is outdated and determining in block 1801 that a reauthentication or a reauthorization has failed.

Figure 19:
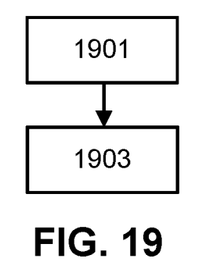

There can be instances when the Ethernet link is not working. FIG. 19 illustrates an aspect of the Ethernet link not working. Turning to FIG. 19, in block 1901, the ECU 110 periodically determines if an Ethernet link is not working. In block 1903, the ECU 110 transitions the at least the ECU 110 to the inactive mode responsive to determining that the Ethernet link is not working. Alternatively, or additionally, if the ECU 110 does not receive a diagnostic request during a specified period and even if the authorization is still valid, the ECU 110 will transition the ECU 110 (and the rest of the active components in the vehicle that were transitioned to the active mode) to the inactive mode.

Figure 20:
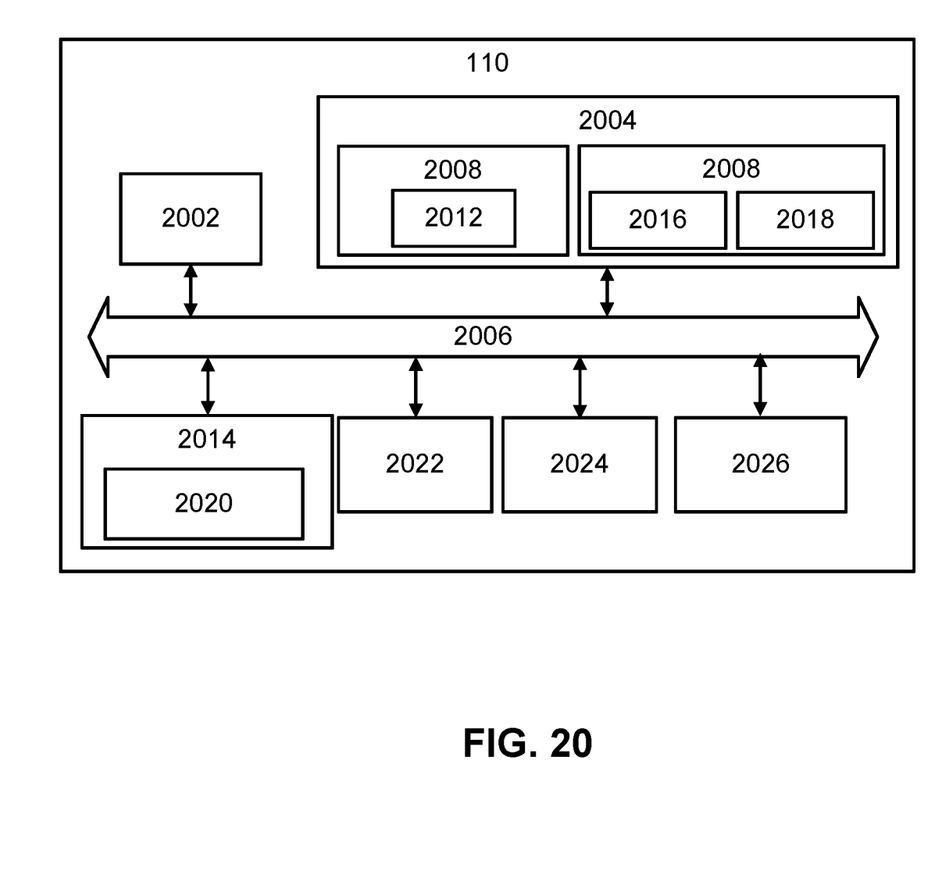
FIG. 20 is a schematic diagram of an exemplary computer system for implementing examples disclosed herein, according to one example.

FIG. 20 is a schematic diagram of an electronic control unit 110. In the description that follows, the ECU 100 is in the form of the computer system 2000. Thus, FIG. is a schematic diagram of a computer system 2000 for implementing examples disclosed herein. The computer system 2000 is adapted to execute instructions from a computer-readable medium to perform these and/or any of the functions or processing described herein. The computer system 2000 may be connected (e.g., networked) to other machines in a LAN, an intranet, an extranet, or the Internet. While only a single device is illustrated, the computer system 2000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 2000 may comprise at least one computing device or electronic device capable of including firmware, hardware, and/or executing software instructions to implement the functionality described herein. The computer system 2000 may include a processor device 2002 (may also be referred to as a control unit), a memory 2004, and a system bus 2006. The computer system 2000 may include at least one computing device having the processor device 2002. The system bus 2006 provides an interface for system components including, but not limited to, the memory 2004 and the processor device 2002. The processor device 2002 may include any number of hardware components for conducting data or signal processing or for executing computer code stored in memory 2004. The processor device 2002 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 2006 may be any of several types of bus structures that may further interconnect to a memory bus (with or without a memory controller), a peripheral bus, and/or a local bus using any of a variety of bus architectures. The memory 2004 may be one or more devices for storing data and/or computer code for completing or facilitating methods described herein. The memory 2004 may include database components, object code components, script components, or other types of information structure for supporting the various activities herein. Any distributed or local memory device may be utilized with the systems and methods of this description. The memory 2004 may be communicably connected to the processor device 2002 (e.g., via a circuit or any other wired, wireless, or network connection) and may include computer code for executing one or more processes described herein. The memory 2004 may include non-volatile memory 2008 (e.g., read-only memory (ROM), erasable programmable read-only memory (EPROM), electrically erasable programmable read-only memory (EEPROM), etc.), and volatile memory 2010 (e.g., random-access memory (RAM)), or any other medium which can be used to carry or store desired program code in the form of machine-executable instructions or data structures and which can be accessed by a computer or other machine with a processor device 2002. A basic input/output system (BIOS) 2012 may be stored in the non-volatile memory 2008 and can include the basic routines that help to transfer information between elements within the computer system 2000.

The computer system 2000 may further include or be coupled to a non-transitory computer-readable storage medium such as the storage device 2014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 2014 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 2014 and/or in the volatile memory 2010, which may include an operating system 2016 and/or one or more program modules 2018. All or a portion of the examples disclosed herein may be implemented as a computer program product 2020 stored on a transitory or non-transitory computer-usable or computer-readable storage medium (e.g., single medium or multiple media), such as the storage device 2014, which includes complex programming instructions (e.g., complex computer-readable program code) to cause the processor device 2002 to carry out the steps described herein. Thus, the computer-readable program code can comprise software instructions for implementing the functionality of the examples described herein when executed by the processor device 2002. The processor device 2002 may serve as a controller or control system for the computer system 2000 that is to implement the functionality described herein.

The computer system 2000 also may include an input device interface 2022 (e.g., input device interface and/or output device interface). The input device interface 2022 may be configured to receive input and selections to be communicated to the computer system 2000 when executing instructions, such as from a keyboard, mouse, touch-sensitive surface, etc. Such input devices may be connected to the processor device 2002 through the input device interface 2022 coupled to the system bus 2006 but can be connected through other interfaces such as a parallel port, an Institute of Electrical and Electronic Engineers (IEEE) 1394 serial port, a Universal Serial Bus (USB) port, an IR interface, and the like. The computer system 2000 may include an output device interface 2024 configured to forward output, such as to a display, a video display unit (e.g., a liquid crystal display (LCD) or a cathode ray tube (CRT)). The computer system 2000 may also include a communications interface 2026 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A method comprising:
    receiving, by a processor device of an electronic control unit (ECU), an indication for a vehicle to transition from an inactive mode to an active mode;
    at least partially transitioning at least the ECU of the vehicle to an active mode responsive to receiving the indication;
    transitioning the at least the ECU back to the inactive mode in response to at least one of:
        determining that an authentication or an authorization was not received during a grace period; or
        determining that an authentication or an authorization failed during the grace period.

2. The method of claim 1, further comprising setting the grace period.

3. The method of claim 2, further comprising:
    starting a grace period timer after receiving the indication based on the grace period; and
    ending the grace period when the grace period timer expires.

4. The method of claim 1, wherein the inactive mode comprises at least one of: a standby mode and a sleep mode or the active mode comprises an awake mode.

5. The method of claim 1, wherein receiving the indication comprises at least one of:
    receiving the indication on a diagnostic Ethernet activation line on a diagnostic connector of the vehicle; or
    receiving the indication wirelessly.

6. The method of claim 1, further comprising at least one of:
    transitioning the at least the ECU to an active mode when a diagnostic tool has successfully authenticated and authorized; or
    transitioning the at least the ECU to an active mode when a user of the diagnostic tool has successfully authenticated and authorized.

7. The method of claim 6, further comprising:
receiving a token from the diagnostic tool when the diagnostic tool or the user has been authenticated and authorized, the token granted for a specified token time period;
responsive to the token being renewed during the specified token time period, keeping the at least the ECU in the active mode;
transitioning the at least the ECU to the inactive mode responsive to at least one of:
determining that the token is outdated; or
determining that a reauthentication or a reauthorization has failed.

8. The method of any of claim 6, further comprising:
transitioning the at least the ECU to the inactive mode responsive to determining that the Ethernet link is not working.

9. The method of claim 1, wherein determining that the authorization has failed comprises:
transitioning the at least the ECU to the inactive mode when the diagnostic tool or the user is determined as not authorized to transition the at least the ECU from the inactive mode to the active mode.

10. A vehicle comprising the processor device to perform the method of claim 1.

11. A control system comprising one or more control units configured to perform the method according to claim 1.

12. A non-transitory computer-readable storage medium comprising instructions, which when executed by the processor device, cause the processor device to perform the method of claim 1.

13. A computer program product comprising program code for performing, when executed by the processor device, the method of claim 1.

14. An electronic control unit (ECU) adapted to perform operations comprising:
receiving, by a processor device of the ECU, an indication for a vehicle to transition from an inactive mode to an active mode;
at least partially transitioning at least the ECU of the vehicle to an active mode responsive to receiving the indication;
transitioning the at least the ECU back to the inactive mode in response to at least one of:
determining that an authentication or an authorization was not received during a grace period; or
determining that an authentication or an authorization failed during the grace period.

15. The ECU of claim 14, wherein the ECU is further adapted to perform operations comprising setting the grace period.

16. The ECU of claim 15, wherein the ECU is further adapted to perform operations comprising:
starting a grace period timer after receiving the indication based on the grace period; and
ending the grace period when the grace period timer expires.

17. The ECU of claim 14, wherein the inactive mode comprises at least one of: a standby mode or a sleep mode and the active mode comprises an awake mode.

18. The ECU of any of claim 14, wherein receiving the indication comprises at least one of:
receiving the indication on a diagnostic Ethernet activation line on a diagnostic connector of the vehicle; or
receiving the indication wirelessly.

19. The ECU of any of claim 14, wherein the ECU is further adapted to perform operations comprising at least one of:
transitioning the at least the ECU to an active mode when a diagnostic tool has successfully authenticated and authorized; or
transitioning the at least the ECU to an active mode when a user of a diagnostic tool has successfully authenticated and authorized.

20. The ECU of claim 19, wherein the ECU is further adapted to perform operations comprising:
receiving a token from the diagnostic tool when the diagnostic tool or the user has been authenticated and authorized, the token granted for a specified token time period;
responsive to the token being renewed during the specified token time period, keeping the at least the ECU in the active mode;
transitioning the at least the ECU to the inactive mode responsive to at least one of:
determining that the token is outdated; or
determining that a reauthentication or a reauthorization has failed.

21. The ECU of claim 19, wherein the ECU is further adapted to perform operations comprising:
transitioning the at least the ECU to the inactive mode responsive to determining that the Ethernet link is not working.

22. The ECU of claim 14, wherein determining that the authorization has failed comprises:
transitioning the at least the ECU to the inactive mode when the diagnostic tool or the user is determined as not authorized to transition the at least the ECU from the inactive mode to the active mode.

* * * * *